United States Patent [19]

Nawa et al.

[11] Patent Number: 4,915,340
[45] Date of Patent: Apr. 10, 1990

[54] POWER SEAT APPARATUS HAVING A LOW FRICTION TRANSMISSION CABLE

[75] Inventors: Hiroshi Nawa, Chiryu; Takami Terada, Toyota, both of Japan

[73] Assignee: Asin Seiki Kabushiki Kaisha, Kariya, Japan

[21] Appl. No.: 217,788

[22] Filed: Jul. 12, 1988

[30] Foreign Application Priority Data

Jul. 24, 1987 [JP] Japan .................................. 62-112640
Sep. 15, 1987 [JP] Japan .................................. 62-140665

[51] Int. Cl.⁴ ............................................. F16M 13/00
[52] U.S. Cl. ...................................... 248/429; 248/419
[58] Field of Search ............... 248/429, 419; 74/502.5, 74/500.5

[56] References Cited

U.S. PATENT DOCUMENTS

| 3,238,808 | 3/1966 | Barnard | 74/502.5 |
| 3,335,995 | 8/1967 | Pickles | 248/419 X |
| 3,990,625 | 11/1976 | Jelling et al. | 271/258 X |
| 4,112,708 | 9/1978 | Fukuda | 74/502.5 X |
| 4,225,757 | 9/1980 | Babb | 181/165 X |
| 4,282,764 | 8/1981 | Harris | 74/424.8 X |
| 4,300,408 | 11/1981 | Yoshifuji | 74/502.5 |
| 4,321,840 | 3/1982 | Kalamon | 74/502.5 |
| 4,381,690 | 5/1983 | Kimble | 248/171 X |
| 4,411,055 | 10/1983 | Simpson et al. | 29/447 |
| 4,572,978 | 2/1986 | VanDuyn | 248/609 X |
| 4,608,959 | 9/1986 | Seynaeve | 124/24 R |
| 4,723,936 | 2/1988 | Buchbinder et al. | 128/657 X |

Primary Examiner—Ramon S. Britts
Assistant Examiner—David G. Kolman
Attorney, Agent, or Firm—Finnegan, Henderson, Farabow, Garrett & Dunner

[57] ABSTRACT

A power seat apparatus includes a seat driving mechanism for supporting a seat member. Upon adjustment of the position of the seat member, the rotational torque is transmitted to the seat driving mechanism via a cable which passes through a protection tube. For decreasing the friction between the cable and the protection tube, the cable is covered with another tube made of heat-shrinkable synthetic resin or is coated with synthetic resin.

5 Claims, 3 Drawing Sheets

POWER SEAT APPARATUS HAVING A LOW FRICTION TRANSMISSION CABLE

BACKGROUND OF THE INVENTION

1. Field of the Invention

The present invention relates to a power seat apparatus, and more paticularly to a power seat apparatus including a seat driving mechanism to which the rotational torque is transmitted through a cable from a motor.

2. Description of the Prior Art

In a conventional power seat apparatus of the type, shown in U.S. Pat. No. 3,335,995 for example, when a motor is brought into operation, the rotational torque is transmitted to a seat driving mechanism through a cable. Due to the rotational torque transmitted to the seat driving mechanism, a seat member mounted thereon is moved in the lengthwise direction of a vehicle body or in the vertical direction. The cable is constituted by twisting a plurality of metal wires and is covered with a protection tube made of synthetic resin. Such cable is inevitably formed at an outer surface thereof with numerous irregularities, thereby increasing sliding friction between the cable and the cover. Thus, transmitting efficiency of the rotational torque is decreased and noise is generated during motor operation.

SUMMARY OF THE INVENTION

It is, therefore, a principal object of the present invention to provide a power seat apparatus without aforementioned drawbacks.

Another object of the present invention is to provide a power seat apparatus in which sliding friction between a cable and a tube is decreased. According to the present invention, a power seat apparatus is comprised of a seat member; a seat driving mechanism supporting the seat member and fixedly mounted on a vehicle body floor; a motor; a cable constituted by twisting a plurality of metal wires and transmitting the rotational torque from the motor to the seat driving member; a protection tube through which the cable is passed; and an intermediate member interposed between the cable and the protection tube so as to decrease the friction therebetween.

In the present invention, due to the interposition of the intermediate member between the cable and the protection tube, the friction therebetween may be decreased, thereby eliminating aforementioned drawbacks.

BRIEF DESCRIPTION OF THE DRAWINGS

The above and other objects, features and advantages of the present invention will become apparent and more readily appreciated from the following detailed description of preferred exemplary embodiment of the invention, taken in connection with the accompanying drawings, in which.

The preferred embodiment will be explained hereinafter with reference to the drawings.

DETAILED DESCRIPTION OF THE PREFERRED EMBODIMENTS

Figure 1:
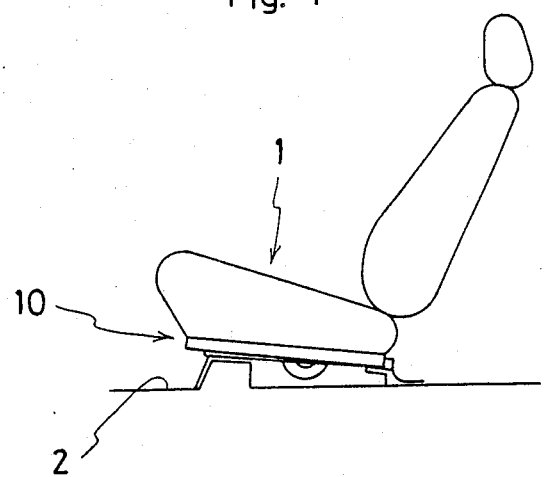
FIG. 1 is a side view of a power seat apparatus according to the present invention.
Figure 2:
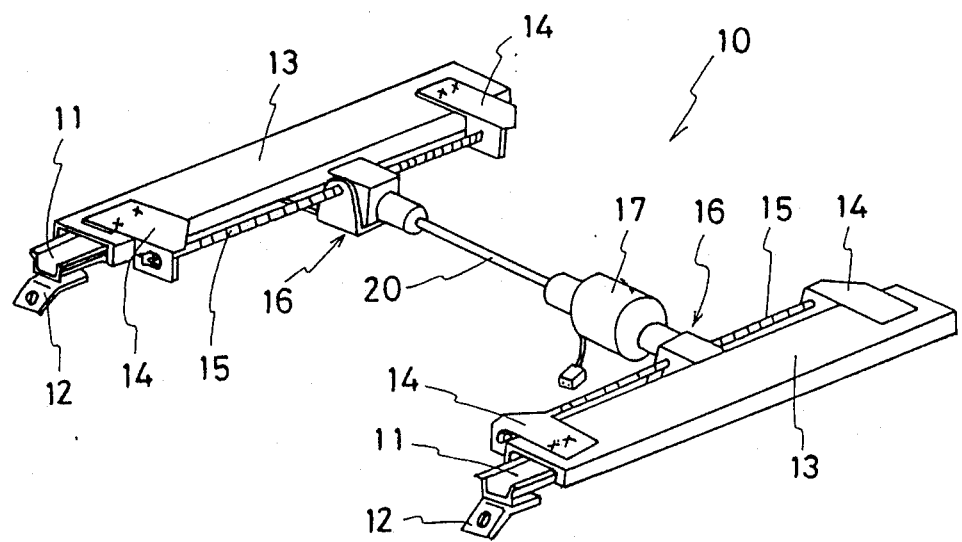
FIG. 2 is a perspective view of a seat driving mechanism which is equipped to a power seat apparatus in FIG. 1.

Referring to FIG. 1, a seat member 1 is fixedly mounted on a seat driving mechanism 10 which is secured on a floor 2 of a vehicle body. As shown in FIG. 2, the seat driving mechanism 10 includes a pair of lower rails 11 and 11 each of which is fixed to the vehicle body floor 2 via bracket 12. On the lower rails 11 and 11, there are slidably mounted a pair of upper rails 13 and 13, respectively. Each upper rail 13 is provided at opposite end portions thereof with a pair of brackets 14 and 14 each of which is in the form of an inward projection. A threaded shaft 15 is rotatably supported at opposite end portions thereof to the respective brackets 14 and 14. A pair of worm-gear mechanisms 16 and 16 are fixed to the respective lower rails 11 and 11. Each worm-gear mechanism 16 is threadably mounted on the corresponding shaft 15 and is connected to a reversible motor 17 via transmitting mechanism 20.

Upon operation of the motor 17, the rotational torque therefrom is transmitted to the worm-gear mechanisms 16 and 16 via the corresponding transmitting mechanisms 20. Then, the shafts 15 and 15 are rotated, thereby moving the upper rails 13 and 13 in the lengthwise direction of the vehicle body. Since the seat member 1 is supported on the upper rails 13 and 13, the seat member 1 is moved in the lengthwise direction of the vehicle body.

Figure 3:
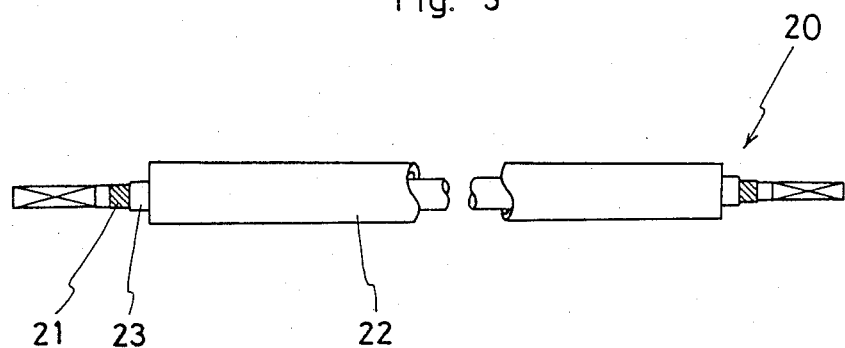
FIG. 3 shows a first mode of a transmitting mechanism adapted in the seat driving mechanism.

As shown in FIG. 3, the transmitting mechanisms 20 includes a cable 21 and a protection tube 22 made of synthetic resin is used to cover the cable 21. Since the cable 21 is obtained by twisting a plurality of metal wires, it is inevitable that numerous irregularities are formed on an outer surface of the cable 21. For establishing an even outer surface of the cable 21, the cable 21 is covered with a tube 23 made of heat-shrinkable synthetic resin. Due to resulting cable 21, friction between the protection tube 22 and rotating cable 21 during operation of the motor 17 is reduced. Thus, smooth rotation of the cable 21 in the protection tube 22 is assured, thereby increasing transmitting efficiency of rotating torque to the transmitting mechanism 20 from the motor 17 and decreasing the noise due to contact of the rotating cable 21 with the protection tube 22.

Instead of the tube 22 made of heat-shrinkable synthetic resin, the following means are available.

Figure 4:
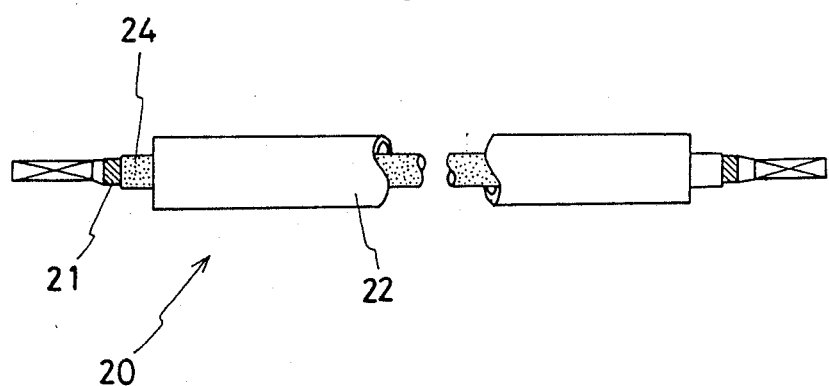
FIG. 4 shows a second mode of a transmitting mechanism adapted in the seat driving mechanism.

(1) Synthetic resin coating 24 is provided on the outer surface of the cable 21, as shown in FIG. 4.

Figure 5:
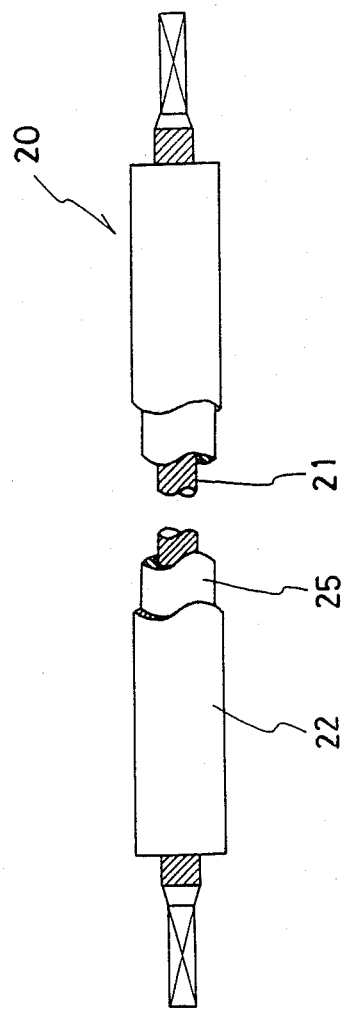
FIG. 5 shows a third mode of a transmitting mechanism adapted in the seat driving mechanism.
Figure 6:
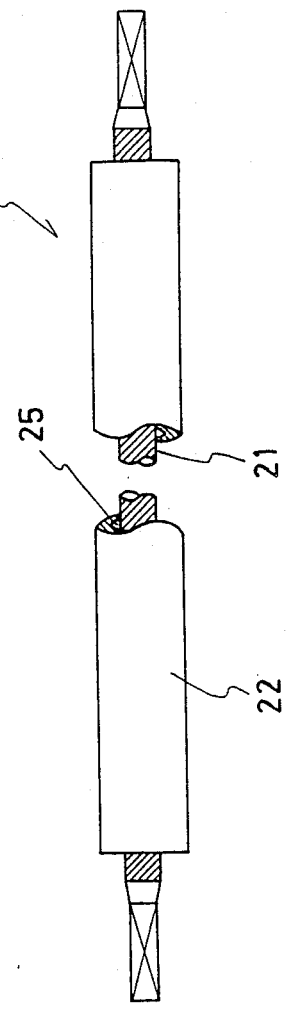
FIG. 6 shows a fourth mode of a transmitting mechanism adapted in the seat driving mechanism.

(2) An intermediate tube 25 which is softer than the protection tube 22 in hardness is interposed between the cable 21 and the protection tube 22 as shown in FIG. 5. This intermediate tube 25 may be integrated with the protection tube 22 upon formation thereof as shown in FIG. 6.

While the invention has been particularly shown and described with referrence to preferred embodiments thereof, it will be understood by those skilled in the art that the foregoing and other changes in form and details can be made therein without departing from the spirit and scope of the invention.

What is claimed is:

1. A power seat apparatus comprising:
   a seat member;
   a seat driving mechanism supporting said seat member and fixedly mounted on a vehicle body floor;
   a motor;
   a cable having an outer circumference constituted by twisting a plurality of metal wires and transmitting a rotational torque from said motor to said seat driving mechanism;
   a protection tube through which said cable is passed, and
   a flexible intermediate member having an inner circumference, interposed between said cable and said protection tube so as to decrease friction therebetween, said inner circumference of said intermediate member disposed to completely adjoin the outer circumference of the cable.

2. A power seat apparatus according to claim 1 wherein said intermediate member is a tube which is made of heat-shrinkable synthetic resin for covering said cable.

3. A power seat apparatus according to claim 1 wherein said intermediate member is a synthetic resin which is coated on said cable.

4. A power seat apparatus according to claim 1 wherein said intermediate member is another tube which is softer than said protection tube in hardness.

5. A power seat apparatus according to claim 4 wherein said another tube is integrated with said protection tube.

* * * * *